US011724135B2

(12) United States Patent
Nichols

(10) Patent No.: US 11,724,135 B2
(45) Date of Patent: Aug. 15, 2023

(54) DEVICES, SYSTEMS AND METHODS RELATING TO SUB-SURFACE FALL PROTECTION ANCHOR

(71) Applicant: Steven Christopher Nichols, Duvall, WA (US)

(72) Inventor: Steven Christopher Nichols, Duvall, WA (US)

( * ) Notice: Subject to any disclaimer, the term of this patent is extended or adjusted under 35 U.S.C. 154(b) by 0 days.

(21) Appl. No.: 17/374,636

(22) Filed: Jul. 13, 2021

(65) Prior Publication Data

US 2022/0072349 A1 Mar. 10, 2022

Related U.S. Application Data

(60) Provisional application No. 63/051,115, filed on Jul. 13, 2020.

(51) Int. Cl.
*F16M 11/00* (2006.01)
*A62B 35/00* (2006.01)
*E04G 21/32* (2006.01)

(52) U.S. Cl.
CPC ...... *A62B 35/0068* (2013.01); *E04G 21/3214* (2013.01)

(58) Field of Classification Search
CPC ............ A62B 35/0068; E04G 21/3214; E04G 21/3276
See application file for complete search history.

(56) References Cited

U.S. PATENT DOCUMENTS

| | | | | |
|---|---|---|---|---|
| 3,367,620 A * | 2/1968 | Henry | E04G 17/0657 403/348 |
| 7,783,519 B2 * | 8/2010 | Alba | G06Q 10/087 705/26.1 |
| 8,635,821 B1 * | 1/2014 | Pierce | A62B 35/0068 52/302.1 |
| 2014/0013700 A1 * | 1/2014 | Pierce | E04G 21/3276 52/698 |
| 2017/0247894 A1 * | 8/2017 | Sargent | A62B 35/04 |
| 2018/0085611 A1 * | 3/2018 | Ettling | A62B 35/0037 |
| 2020/0276463 A1 * | 9/2020 | Newing | E04G 21/329 |

* cited by examiner

*Primary Examiner* — Amy J. Sterling
(74) *Attorney, Agent, or Firm* — King IP Law; Joshua King

(57) ABSTRACT

Sub-surface roof attachment systems, methods, etc., configured for anchoring a personal fall protection anchorage device to a roof, the sub-surface roof attachment system comprising an anchor point base plate sized and configured for attachment to an upper surface of a support substrate, wherein the anchor point base plate is configured to immobily hold the personal fall protection anchorage device to the support substrate adequate for safe fall protection for a worker, the anchor point base plate further comprising an upwardly extendible adjustment bolt, an upper surface of the upwardly extendible adjustment bolt having a cavity therein configured to immobily receive and hold the personal fall protection anchorage device.

15 Claims, 4 Drawing Sheets

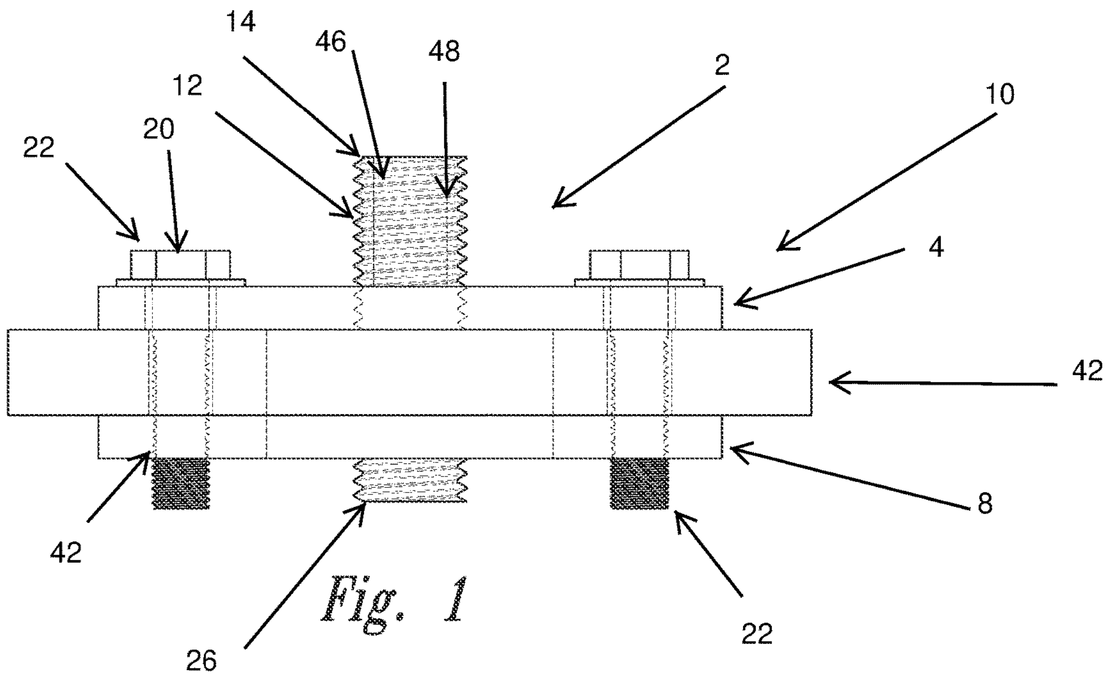
Fig. 1
Fig. 2
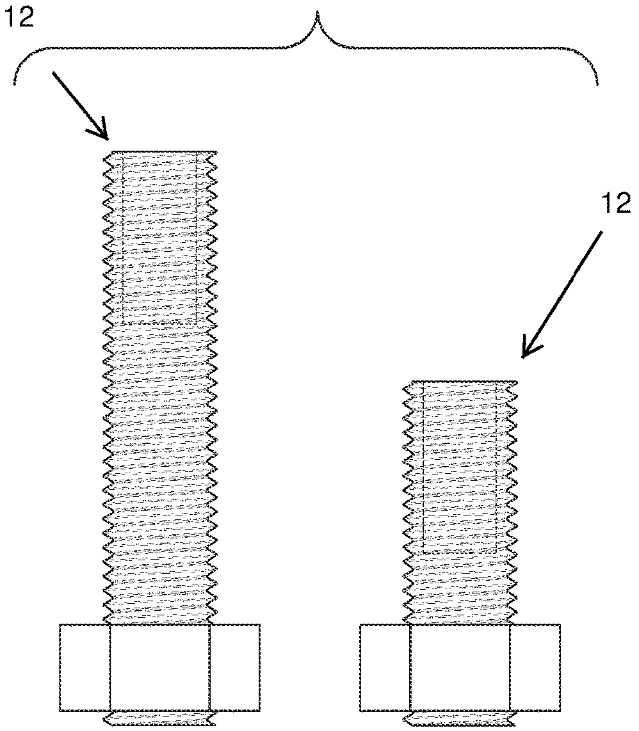
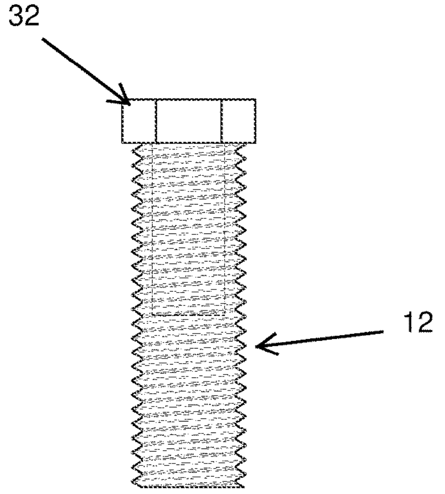
Fig. 3

DEVICES, SYSTEMS AND METHODS RELATING TO SUB-SURFACE FALL PROTECTION ANCHOR

CROSS-REFERENCE TO RELATED APPLICATIONS

The present application claims the benefit of U.S. Provisional Patent Application Ser. No. 63/051,115, filed Jul. 13, 2020, which application is incorporated herein by reference in its entirety.

BACKGROUND

Commercial Roof Anchors (CRA) are a generic design fall protection roof anchor used for personal fall protection by construction and maintenance workers exposed to fall hazards; such CRAs provide attachment points for worker's lifelines. CRAs typically have a three component design: 1) base plate, 2) riser, and 3) top fixture.

CRAs are manufactured using various dimensions for those three components as desired to meet the design of a particular roofing system, framing configuration and engineering requirements. For example, the riser dimension extends well above the roof's surface, and the riser height may be lengthened to accommodate rigid insulation applied over the substrate while preserving the serviceable portion of the riser above the finished roofing membrane, thus allowing access to connect a fall protection device. These types of anchors have been manufactured for at least 20 years by many different manufactures. CRA anchors are typically installed onto commercial roof structures that are flat or low slope. The base plates are engineered to be attached to wood substrates, metal roof decking (not metal roofing panels) or may be bolted to wood or metal structural beams. The riser component is often field welded to a steel structural member without a base plate.

Traditional CRA anchors are now being adapted to multi-family and residential construction. However, these types of structures often have roof systems that are sloped and highly visible, and utilize different substrates than commercial work. This creates a problem with the installation of standard CRAs, which requires the base plate to be attached to the top surface of the substrate which in turn is attached to the supporting structure, for example wood I-Joist trusses with ¾" substrate.

Thus, there has gone unmet a need for improved devices, systems and/or methods that provide for low-profile, strong, secure attachment of CRAs to roofing trusses, joists, chords, etc., adequate for safe and secure fall protection for workers.

The present systems and methods, etc., provide one or more of these and/or other advantages.

SUMMARY

The present systems, devices, assemblies, methods, etc., herein provide personal fall protection equipment (PFP), which are a form of personal protective equipment (PPE). In the systems, devices, etc., herein the PFPs comprise sub-surface fall protection anchors/anchor points sized and configured, i.e., structured, for surface mounted installation into support surfaces (substrates) such as concrete decks, wood framing and structural steel.

In some embodiments, the current assemblies, etc., comprise sub-surface roof attachment systems configured for anchoring a personal fall protection anchorage device such as a D-loop anchor point, to a roof. The sub-surface roof attachment systems comprise an anchor point base plate sized and configured for attachment to an upper surface of a support substrate, wherein the anchor point base plate is configured to immobily hold, and does immobily hold when in use, the personal fall protection anchorage device to the support substrate. Such "immobily hold" means that the system is adequate for safe fall protection for a worker that may fall while tethered to the system. The anchor point base plate further comprises an upwardly extendible adjustment bolt, which can be a threaded bolt, a telescoping tube, or other strong, extendible elongated structure, wherein an upper surface of the upwardly extendible adjustment bolt has a cavity such as a threaded hold, therein configured to immobily receive and hold the personal fall protection anchorage device.

The system further can comprise a backer plate sized and configured to cooperatively capture the support surface between the anchor point base plate and the backer plate. The personal fall protection anchorage device can comprise a D-ring sized and configured to hold a personal fall protection lifeline, or any other configuration suitable to securely hold a lifeline.

The system further can comprise at least one anchor point base plate-substrate connector. The anchor point base plate-substrate connector can comprise at least one of bolts, nails, screws or industrial-strength glue. For example where the anchor point base plate-substrate connector comprises 2 to 4, or more, bolts, such bolts that pass through the anchor point base plate to thread into the substrate to hold the anchor point base plate to the substrate. In some embodiments, the 2 to 4 bolts further thread into a corresponding number of threaded bolt holes in the backer plate of claim 2.

The upwardly extendible adjustment bolt can be a threaded anchor-bolt and the anchor point base plate can comprise a matchingly threaded anchor-bolt passage such that rotation of the threaded anchor-bolt in the anchor-bolt passage raises or lowers the upwardly extendible adjustment bolt.

The cavity of the upwardly extendible adjustment bolt can be a threaded anchor-bolt passage that matches a threaded stem of the personal fall protection anchorage device. The system further can comprise a temporary plug to temporarily plug the cavity of the upwardly extendible adjustment bolt, which temporary plug can be a temporary bolt plug.

The system further can comprise a removable cover plate that covers the system when not in use. The removable cover plate can be substantially flat, i.e., pose no tripping hazard to people walking by.

In other embodiments, the systems, etc., herein are provided in kits comprising one or more of the sub-surface roof attachment systems and a drill template. The drill template can be an adhesive backed drill template, and the kit can further comprise a personal fall protection lifeline.

Methods herein including manufacturing and/or using the roof attachment systems herein as well as the personal fall protection systems herein.

These and other aspects, features and embodiments are set forth within this application, including the following Detailed Description and attached drawings. Unless expressly stated otherwise, all embodiments, aspects, features, etc., can be mixed and matched, combined and permuted in any desired manner.

BRIEF DESCRIPTION OF THE DRAWINGS

FIG. 1 depicts a side plan view of an exemplary embodiment of the current sub-surface fall protection anchors and systems herein as installed in concrete and sandwiching plywood between the anchor point base plate and backer plate.

FIG. 2 depicts a side plan view of exemplary embodiments of upwardly extendible adjustment elements, here upwardly extendible adjustment bolts.

FIG. 3 depicts a side plan view of an exemplary embodiment of a temporary plug, here a temporary bolt hole plug.

DETAILED DESCRIPTION

Figure 4:
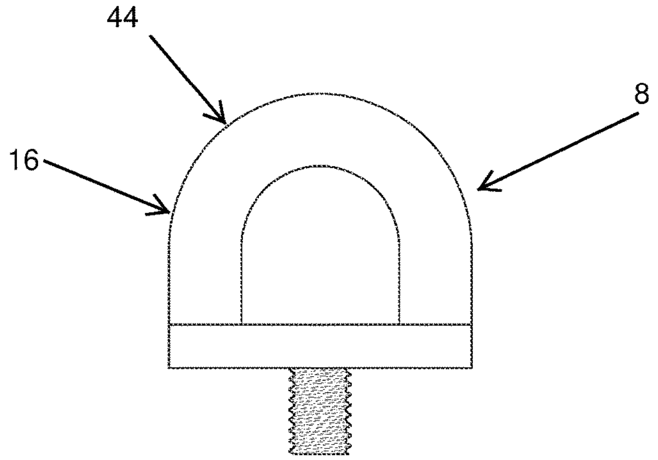
FIG. 4 depicts a side plan view of an exemplary embodiment of a personal fall protection anchorage device having a loop top.

The present systems, devices and methods, etc., provide personal fall protection equipment (PFP), which are a form of personal protective equipment (PPE). In the systems, devices, etc., herein the PFPs comprise sub-surface fall protection anchors/anchor points sized and configured, i.e., structured, for surface mounted installation into support surfaces (substrates) such as concrete decks, wood framing and structural steel.

Briefly, and as shown in the exemplary embodiments in the figures submitted herewith, components of the anchors/anchor points variously include an anchor point base plate configured for attachment to an upper surface of the support substrate, e.g., by attaching the base plate to an abutting surface of a concrete substrate by use of one or more base plate-substrate connectors, such as bolts, nails, screws, industrial-strength glue, etc. In some embodiments, the base plate-substrate connectors are 2-4 bolts that pass through the anchor point base plate to thread into the substrate to hold the anchor point base plate to the substrate. The substrate can be oriented in any direction, such as overhead, interior, exterior, flat, vertical, non-flat, etc., and can be any desired suitable material such as concrete, vinyl, wood, ceramic tile and carpeting and other types of materials that are used for finished surfaces.

The anchor point base plate comprises at least one anchor-bolt passage, which can be a centrally located threaded hole, through which an elongated anchor stem passes. In the embodiments shown in the figures herein, the elongated anchor stem is a upwardly extendible adjustment bolt but any suitable elongated anchor stem can be suitable, such as a telescoping tube. In some embodiments, the elongated anchor stem is an anchor-bolt that threadingly matches the anchor-bolt passage, whereby rotation of the anchor-bolt in the anchor-bolt passage raises or lowers the anchor point, such as a looped anchor point, attached at a distal end of the anchor-bolt. The anchor point and anchor-bolt can be unitary or separate combined elements, including that the anchor point can be detachable from the anchor-bolt when not in-use.

The system can further comprise an adjustment bolt, for example 3" or 5" long, that seats into or through the anchor point base plate and/or substrate. This adjustment bolt can be threadingly matched and/or sealed into the anchor-bolt passage of the anchor point base plate. In such embodiments, the adjustment bolt can form the receiving structure to securely hold the anchor-bolt. In some embodiments, there can also be a temporary bolt plug or other temporary insert that threads into the adjustment bolt. This temporary bolt plug can serve as an anchor-bolt for a removable anchor point just as a removable loop top, or it can be removed as desired and a unitary anchor-bolt+anchor point is inserted into the adjustment bolt.

In some embodiments, such as where the substrate is thin enough, the system can also include a backer plate that is situated on a back surface of the thin substrate. The backer plate can provide anchor points for the base plate-substrate connectors, additional strength for the anchor point, etc.

In some embodiments, the system can also include a removable cover plate that covers the embedded portions of the system when they are not in use. This can, for example, advantageously protect the system from weather and other harmful forces, and also protect humans and animals from the embedded elements of the system that might otherwise stick up or present a hole that things could fall into.

In some embodiments, the adjustment bolt inner threads are designed to receive a bolt attached PPE connector (loop top fixture or other connector) when in use for fall protection in a wide range of applications such as: exterior and interior anchor points installations for vertical walls, ceilings, elevator shafts, walk decks, patios, balconies and floors. After use as fall protection, the adjustment bolt receives a temporary cover that threads in flush with the exterior or interior surface. The system typically has a low profile design that does not pose a tripping hazard and is visually acceptable in commercial applications such as hotels and office buildings that are finished with concrete, vinyl, wood, ceramic tile and carpeting and other types of materials that are used for finished surfaces.

In some embodiments, the adjustment bolt interface with the threaded base plate allows the bolt's top surface to be adjusted to various substrate thickness. A corresponding backer plate can be used to bolt attach the anchor base plate to the substrate such as wood framing, sheathing, structural steel or embedded into concrete.

In some embodiments, the systems, devices, methods, etc., herein provide an adjustable height receiver that is integrated with a bolt-attached base plate. The base plate stabilizes the adjustment bolt and allows direct bury of the system into concrete substrates. The systems can also be installed between or around substrates using the backer plate.

Although suitable in some embodiments, in other embodiments, the anchor point and/or anchor-bolt do not comprise a detent pin configuration, such a ball lock devices, so that the stresses and forces, such as shear loads applied to the systems and devices herein are more evenly distributed across the system and the possibility of system-failures is reduced.

Turning to a further discussion of the figures, in some aspects, FIGS. 1-9 provide exemplary embodiments of the present systems, devices and methods, etc., herein. The figures include exemplary dimensions and other information; all information in the figures is merely exemplary and not limiting.

Turning to FIG. 1, it depicts a side plan view of an exemplary embodiment of the current sub-surface fall protection anchors including sub-surface fall protection anchors systems 2 herein as installed in concrete 40 and sandwiching plywood 42 between the anchor point base plate 4 and backer plate 8. The sub-surface fall protection anchors systems 2 is largely installed below the upper reaches of support surface 10 with the top of the adjustment bolt, i.e., the upper surface 14 of upwardly extendible adjustment bolt 12 substantially level with the upper surface of support surface 10. The sub-surface roof attachment system 2 and/or upwardly extendible adjustment bolt 12 can also be located fully below, partially above and below, or above the upper surface 14 of support surface 10, or otherwise as desired.

Upwardly extendible adjustment bolt 12 comprises a cavity 46, which in the embodiment shown is a threaded anchor-bolt passage 48. The upwardly extendible adjustment bolt 12 passes through threaded anchor-bolt passage 28. In the embodiment shown, the upwardly extendible adjustment bolt 12 is a threaded anchor-bolt 26 and the anchor point base plate 4 comprises a matchingly threaded anchor-bolt passage 28 such that rotation of the threaded anchor-bolt 26 in the anchor-bolt passage 28 raises or lowers the upwardly extendible adjustment bolt 12. The cavity 46 in upwardly extendible adjustment bolt 12 can be threaded, as in the embodiment shown, and is sized and configured to securely, immobily hold a 6 personal fall protection anchorage device 6 (see following figures).

Figure 5:
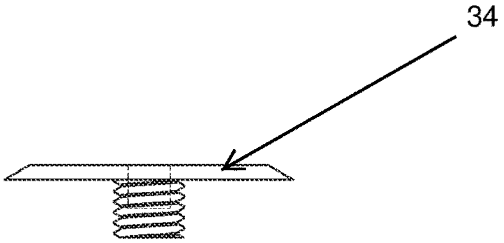
FIG. 5 depicts a side plan view of an exemplary embodiment of a removable cover plate, here a removable cap.
Figure 6:
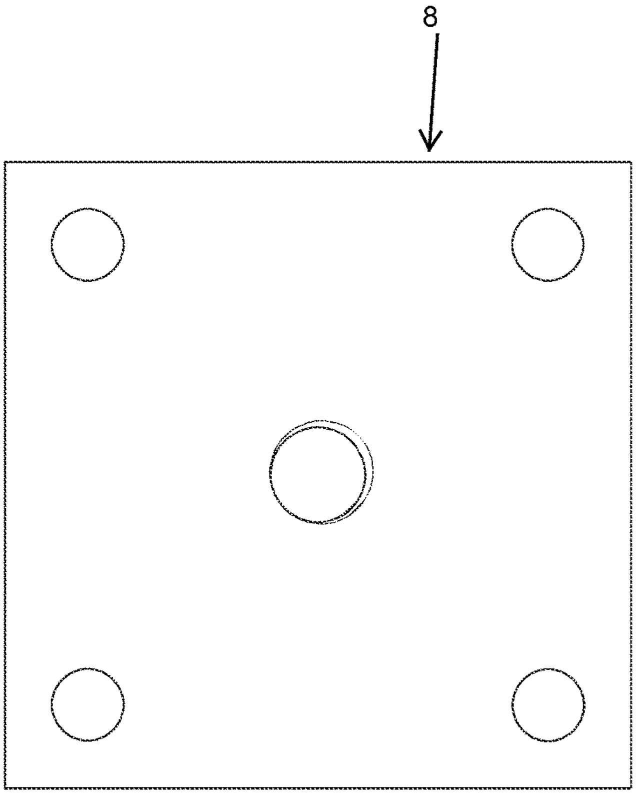
FIG. 6 depicts a top plan view and a side plan view of an exemplary embodiment of a backer plate.
Figure 7:
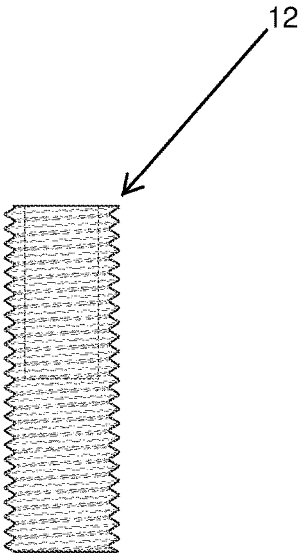
FIG. 7 depicts a top plan view and a side plan view of an exemplary embodiment of an upwardly extendible adjustment bolt.

FIG. 2 depicts a side plan view of exemplary embodiments of upwardly extendible adjustment elements, here upwardly extendible adjustment bolts 12. FIG. 3 depicts a side plan view of an exemplary embodiment of a temporary plug 32, here a temporary bolt hole plug. FIG. 4 depicts a side plan view of an exemplary embodiment of a personal fall protection anchorage device 6 having a loop top 44 in the shape of a D-ring 16. FIG. 5 depicts a side plan view of an exemplary embodiment of a removable cover plate 34, here a removable cap. FIG. 6 depicts a top plan view and a side plan view of an exemplary embodiment of a backer plate 8. FIG. 7 depicts a top plan view and a side plan view of an exemplary embodiment of an upwardly extendible adjustment bolt 12.

Figure 8:
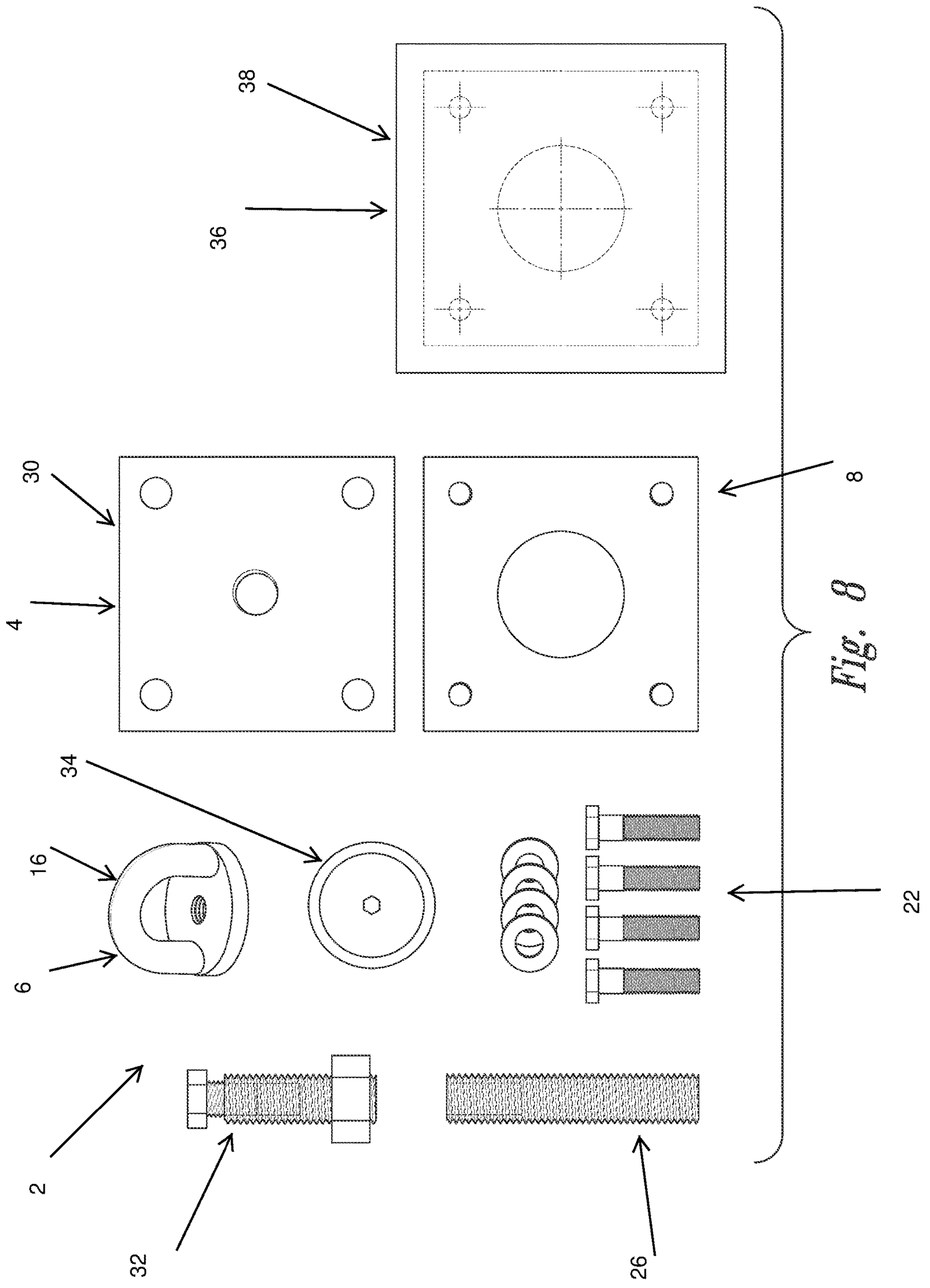
FIG. 8 depicts a top plan view of an exemplary embodiment of a kit comprising various elements of the systems herein.

FIG. 8 depicts a top plan view of an exemplary embodiment of a kit 30 comprising various elements of the sub-surface roof attachment system 2 herein. Such include at least two or more of the following elements: anchor point base plate 4, personal fall protection anchorage device 6 having a D-ring 16, temporary plug 32, backer plate 8, upwardly extendible adjustment bolt 12, personal fall protection lifeline 18 (shown in FIG. 9), bolts 22, threaded anchor-bolt 26, removable cover plate 34, drill template 36.

Figure 9:
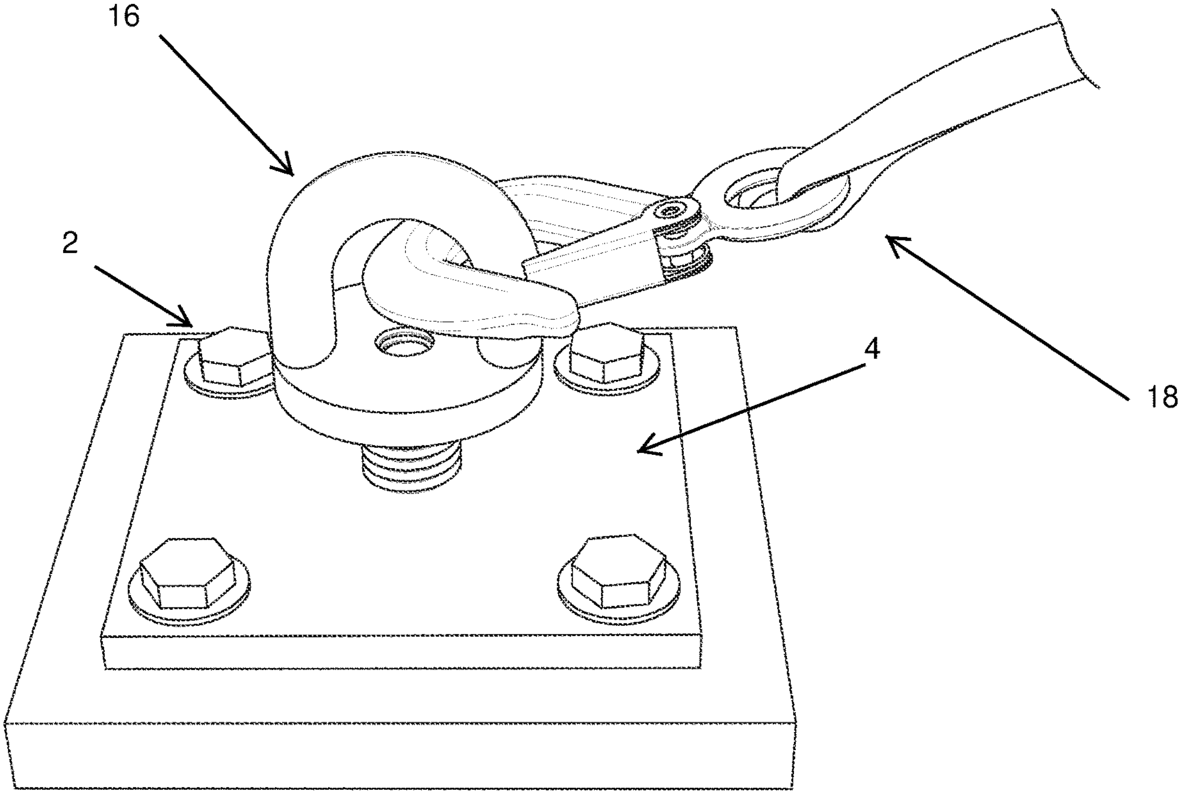
FIG. 9 depicts perspective view of an exemplary embodiment of a sub-surface roof attachment system herein with a PPE lifeline attached.

FIG. 9 depicts perspective view of an exemplary of a sub-surface roof attachment system 2 herein with a PPE personal fall protection lifeline 18 attached.

Methods herein including manufacturing and/or using the roof attachment system 6 herein as well as the personal fall protection systems herein.

The following provide additional embodiments, examples, etc., of the various systems, devices, elements, etc., herein:

All terms used herein are used in accordance with their ordinary meanings unless the context or definition clearly indicates otherwise. Also unless expressly indicated otherwise, in the specification the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

Unless otherwise stated, adjectives herein such as "substantially" and "about" that modify a condition or relationship characteristic of a feature or features of an embodiment, indicate that the condition or characteristic is defined to within tolerances that are acceptable for operation of the embodiment for an application for which it is intended.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A sub-surface roof attachment system configured for anchoring a personal fall protection anchorage device to a support substrate of a roof, the sub-surface roof attachment system comprising a substantially flat anchor point base plate having a substantially flat lower surface for surface mounting on a corresponding substantially flat upper surface of the support substrate, wherein the support substrate comprises at least one of concrete, vinyl, wood, ceramic tile, sheathing or carpeting, and wherein the anchor point base plate is configured to immobily hold the personal fall protection anchorage device to the support substrate adequate for safe fall protection for a worker, the anchor point base plate further comprising an upwardly extendible adjustment bolt, an upper surface of the upwardly extendible adjustment bolt having a cavity therein configured to immobily receive and hold the personal fall protection anchorage device, and wherein the system further comprises an anchor point base plate-substrate connector comprising at least one of a) at least 2 bolts that pass through the anchor point base plate to thread into the substantially flat upper surface of the support substrate to hold the anchor point base plate to the support substrate, b) at least 2 nails that pass through the anchor point base plate and into the substantially flat upper surface of the support substrate to hold the anchor point base plate to the support substrate, c) at least 2 screws that pass through the anchor point base plate to thread into the substantially flat upper surface of the support substrate to hold the anchor point base plate to the support substrate, or d) industrial-strength glue that adheres the substantially flat anchor point base plate to the substantially flat upper surface of the support substrate.

2. The system of claim 1 wherein the system further comprises a backer plate sized and configured to cooperatively capture the support surface between the anchor point base plate and the backer plate.

3. The system of any one of claims 1 to 2 wherein the personal fall protection anchorage device comprises a D-ring sized and configured to hold a personal fall protection lifeline.

4. The system of claim 1 wherein the anchor point base plate-substrate connector comprises 2 to 4 bolts that pass through the anchor point base plate to thread into the support substrate to hold the anchor point base plate to the support substrate.

5. The system of claim 4 wherein the 2 to 4 bolts further thread into a corresponding number of threaded bolt holes in the backer plate of claim 2.

6. The system of any one of claims 1 to 2 wherein the upwardly extendible adjustment bolt is a threaded anchor-bolt and the anchor point base plate comprises a matchingly threaded anchor-bolt passage such that rotation of the threaded anchor-bolt in the anchor-bolt passage raises or lowers the upwardly extendible adjustment bolt.

7. The system of claim 6 wherein the cavity of the upwardly extendible adjustment bolt is a threaded anchor-bolt passage that matches a threaded stem of the personal fall protection anchorage device.

8. The system of any one of claims 1 to 2 wherein the system further comprises a temporary plug to temporarily plug the cavity of the upwardly extendible adjustment bolt.

9. The system of claim 8 wherein the temporary plug is a temporary bolt plug.

10. The system of any one of claims 1 to 2 wherein the system further comprises a removable cover plate that covers the system when not in use.

11. The system of claim 10 wherein the removable cover plate is substantially flat.

12. A kit comprising a sub-surface roof attachment system configured for anchoring a personal fall protection anchorage device to a support substrate of a roof, the sub-surface roof attachment system comprising a substantially flat anchor point base plate having a substantially flat lower surface for surface mounting on a corresponding substantially flat upper surface of the support substrate, wherein the support substrate comprises at least one of concrete, vinyl, wood, ceramic tile, sheathing or carpeting, and wherein the anchor point base plate is configured to immobily hold the personal fall protection anchorage device to the support substrate adequate for safe fall protection for a worker, the anchor point base plate further comprising an upwardly extendible adjustment bolt, an upper surface of the upwardly extendible adjustment bolt having a cavity therein configured to immobily receive and hold the personal fall protection anchorage device, and wherein the system further comprises an anchor point base plate-substrate connector comprising at least one of a) at least 2 bolts that pass through the anchor point base plate to thread into the substantially flat upper surface of the support substrate to hold the anchor point base plate to the support substrate, b) at least 2 nails that pass through the anchor point base plate and into geh substantially flat upper surface of the support substrate to bold the anchor point base plate to the support substrate, c) at least 2 screws that pass through the anchor point base plate to thread into the substantially flat upper surface of the support substrate to hold the anchor point base plate to the support substrate, or d) industrial-strength glue that adheres the substantially flat anchor point base plate to the substantially flat upper surface of the support substrate, and wherein the kit comprises a drill template.

13. The kit of claim 12 wherein the drill template is an adhesive backed drill template.

14. A kit comprising a sub-surface roof attachment system configured for anchoring a personal fall protection anchorage device to a support substrate of a roof, the sub-surface roof attachment system comprising a substantially flat anchor point base plate having a substantially flat lower surface for surface mounting on a corresponding substantially flat upper surface of the support substrate, wherein the support substrate comprises at least one of concrete, vinyl, wood, ceramic tile, sheathing or carpeting, and wherein the anchor point base plate is configured to immobily hold the personal fall protection anchorage device to the support substrate adequate for safe fall protection for a worker, the anchor point base plate further comprising upwardly extendible adjustment bolt, an upper surface of the upwardly extendible adjustment bolt having a cavity therein configured to immobily receive and hold the personal fall protection anchorage device, and wherein the system further comprises an anchor point base plate-substrate connector comprising at least one of a) at least 2 bolts that pass through the anchor point base plate to thread into the substantially flat upper surface of the support substrate to hold the anchor point base plate to the support substrate, b) at least 2 nails that pass through the anchor point base plate and into geh substantially flat upper surface of the support substrate to hold the anchor point base plate to the support substrate, c) at least 2 screws that pass through the anchor point base plate to thread into the substantially flat upper surface of the support substrate to hold the anchor point base plate to the support substrate, or d) industrial-strength glue that adheres the substantially flat anchor point base plate to the substantially flat upper surface of the support substrate, and wherein the kit further comprises a personal fall protection lifeline.

15. The kit of any one of claims 12 to 14 wherein the system further comprises a backer plate sized and configured to cooperatively capture the support surface between the anchor point base plate and the backer plate.

* * * * *